Patented Feb. 10, 1931

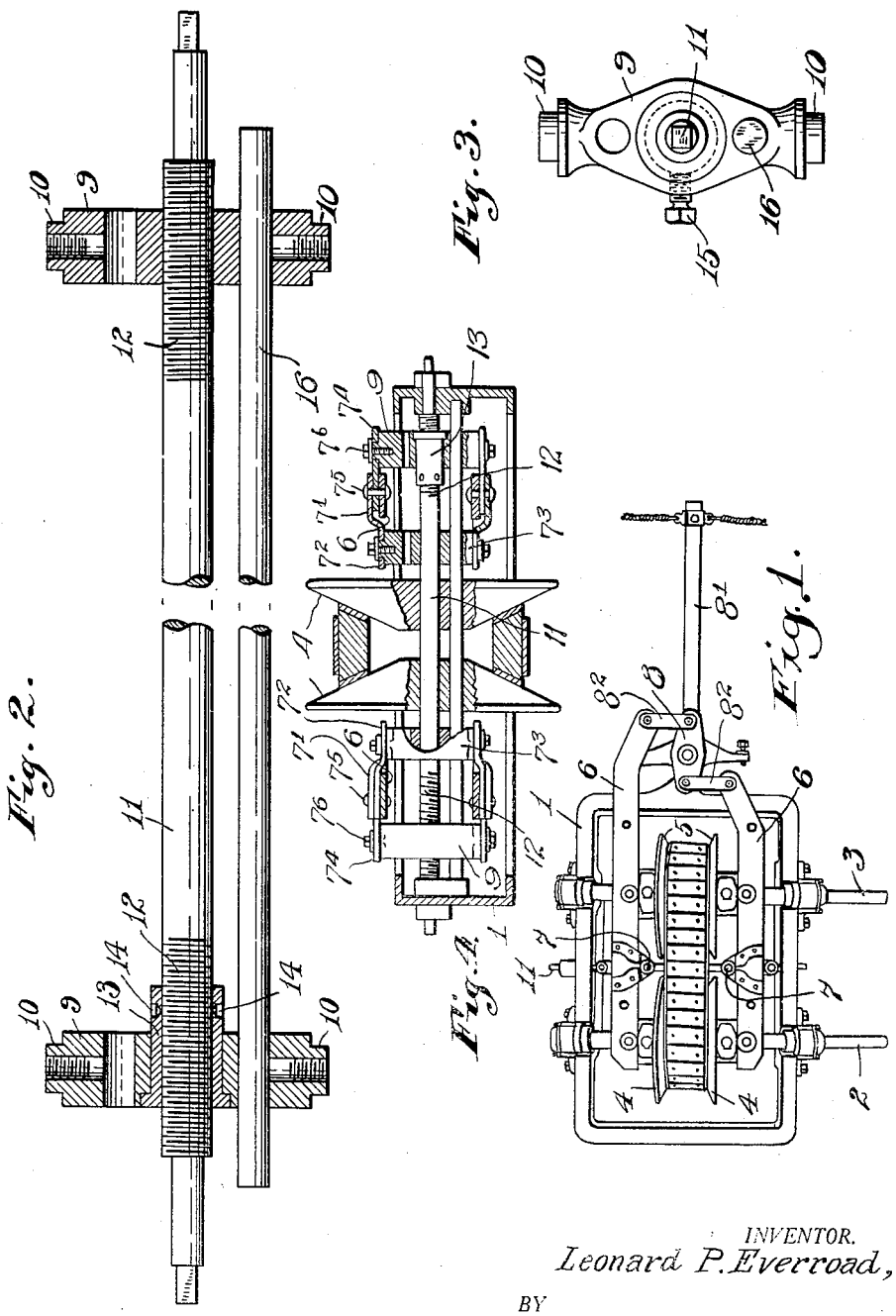

1,792,215

UNITED STATES PATENT OFFICE

LEONARD P. EVERROAD, OF COLUMBUS, INDIANA, ASSIGNOR TO REEVES PULLEY COMPANY, OF COLUMBUS, INDIANA, A CORPORATION OF INDIANA

PULLEY TRANSMISSION ADJUSTMENT

Application filed September 8, 1924. Serial No. 736,453.

In that type of cone-pair transmission wherein there is provided two pairs of cones, each pair respectively mounted on a shaft and axially shiftable on said shaft by suitable shifting mechanism, it is desirable that the cones on the two shafts be accurately aligned. In assembling the apparatus, due to slight inaccuracies in machining and finishing, it is difficult to assemble the cones on their shafts and their shifting mechanism in such a manner that the cones are accurately aligned. Furthermore, after the transmissions have been in use it sometimes happens that due to wear of the parts or for other causes the cones shift slightly out of alignment.

It is one of the objects of my invention to provide means for accurately aligning the cones after all of the parts of the apparatus have been assembled and to provide means whereby in event the cones for any reason become shifted out of alignment after use, the cones may be re-aligned without disturbing any of the parts of the mechanism and without dis-assembling the mechanism.

For the purpose of disclosing my invention I have illustrated one embodiment of my invention in the accompanying drawings in which Fig. 1 is a plan view of a transmission embodying my invention;

Fig. 2 is a detail elevation of the mounting means for the shifting levers;

Fig. 3 is an end view thereof; and

Fig. 4 is a sectional view showing the mounting means for the pulley operating levers.

In the structure illustrated, a suitable supporting frame 1 is provided in which are journalled a driving shaft 2 and the driven shaft 3, said shafts being parallel and provided with axially movable cone-pairs 4, 4 and 5, 5 respectively, said cone-pairs being splined upon their respective shafts and oppositely shiftable toward and away from each other by means of shifting levers 6, 6 fulcrumed at 7 and simultaneously shifted in oppposite directions by means of a shifting mechanism 8. Each lever has secured thereon a saddle member 7' having a projection $7^2$ pivotally connected to a guiding member $7^3$. This saddle at its center portion is slightly raised above the top surface of the lever and interposed between the saddle and the top of the lever is a link $7^4$ connected to the lever by a pin $7^5$. The fulcrum members 9 on which the shifting levers 6, 6 are fulcrumed are provided with suitable pivot heads 10 for the levers which heads pivotally receive the opposite ends of the links $7^4$, which are held in position on the heads by securing bolts $7^6$. These fulcrum members are mounted on a cross rod 11 which is supported in the frame 1. This cross rod is oppositely screw threaded at opposite ends as at 12 and the fulcrum members 9 are threaded thereon, so that by bodily turning the cross bar the cones of each pair may be simultaneously moved toward or away from one another to thereby vary the tension on the belt. Preferably one of the fulcrum members is provided with a rotatable bushing 13 internally threaded to engage the threads 12 of one end of the rod 11 and this bushing is provided with openings 14 to be engaged by a wrench for turning the bushing when the parts are assembled. The bushing is locked against rotation by means of a suitable set screw 15. When the parts are assembled the fulcrum members are screw threaded onto the rod 11 to position, after which they are locked against rotation and against skewing by means of the lock rod 16 passing through openings near ends thereof and engaging in the frame. The remaining parts of the transmission are assembled, including the shifting levers 6. The shifting mechanism in the present instance includes a lever 8' connected to the respective shifting levers 6 by links $8^2$. If, after the assemblage of the parts it is found that the levers 6 are not properly aligned, due to some slight inaccuracy in the lengths of the links $8^2$, it is very easy to align the parts by adjusting the fulcrum members independently. This may be accomplished by loosening the set screw 15 so that the bushing 13 will be disconnected from its corresponding fulcrum member whereby by turning the rod 11 in one direction or the other the fulcrum member opposite that having the bushing 13 may be adjusted independently of the one having the bushing 13 to properly align the lever 6 or the fulcrum member having the bushing 13 may be adjusted, by turning the bushing to properly align the lever fulcrumed on the fulcrum member. After the parts have been properly aligned the bushing is then locked to the fulcrum member by setting the screw 15 tight so that during other operations the two fulcrum members will be moved towards or away from one another when the rod 11 is pivoted. It is obvious that the same mechanism may be used for adjusting the parts in event they get out of alignment through wear or for other reasons.

I claim as my invention:

In a speed varying transmission the combination with a frame having side members, of belt receiving cone-pairs, shafts journalled in the side members of said frame and upon which said cone-pairs are splined, a pair of oppositely disposed controlling levers each adapted to shift a cone of each pair, a fulcrum member for each of said levers, a rod extending between the side members of the frame and on which said fulcrum members are slidably mounted, an oppositely threaded shaft extending between said side members and having its threads engaging said fulcrum members for simultaneously shifting the same and a bushing interposed between the threads of said shaft and one of said fulcrum members to permit the shifting of the other fulcrum member independently of the first fulcrum member.

In witness whereof, I, LEONARD P. EVERROAD, have hereunto set my hand at Columbus, Indiana, A. D. one thousand nine hundred and twenty four.

LEONARD P. EVERROAD.